United States Patent [19]

Goldberg

[11] Patent Number: 6,154,579
[45] Date of Patent: *Nov. 28, 2000

[54] CONFUSION MATRIX BASED METHOD AND SYSTEM FOR CORRECTING MISRECOGNIZED WORDS APPEARING IN DOCUMENTS GENERATED BY AN OPTICAL CHARACTER RECOGNITION TECHNIQUE

[75] Inventor: Randy G. Goldberg, Princeton, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,199

[22] Filed: Aug. 11, 1997

[51] Int. Cl.⁷ .............................. G06K 9/03; G06K 9/72
[52] U.S. Cl. ........................ 382/310; 382/231; 382/228
[58] Field of Search .................................. 382/229, 231, 382/225, 189, 228, 187, 198, 310, 321; 704/1, 9, 10; 707/533

[56] References Cited

U.S. PATENT DOCUMENTS

| | | |
|---|---|---|
| 3,466,394 | 9/1969 | French . |
| 3,752,904 | 8/1973 | Waterbury . |
| 3,896,266 | 7/1975 | Waterbury . |
| 3,988,715 | 10/1976 | Mullan et al. . |
| 4,718,102 | 1/1988 | Crane et al. . |
| 4,783,804 | 11/1988 | Juang et al. ............................. 704/245 |
| 4,817,156 | 3/1989 | Bahl et al. .............................. 704/256 |
| 4,819,271 | 4/1989 | Bahl et al. .............................. 704/256 |
| 4,908,865 | 3/1990 | Doddington et al. .................... 704/272 |
| 5,023,912 | 6/1991 | Segawa ..................................... 381/43 |
| 5,027,406 | 6/1991 | Roberts et al. ........................... 381/43 |
| 5,034,989 | 7/1991 | Loh ......................................... 382/189 |
| 5,050,215 | 9/1991 | Nishimura ............................... 704/244 |
| 5,101,345 | 3/1992 | MacPhail .................................... 707/1 |
| 5,125,022 | 6/1992 | Hunt et al. ................................ 379/88 |
| 5,127,043 | 6/1992 | Hunt et al. ................................ 379/88 |
| 5,167,016 | 11/1992 | Bagley et al. .......................... 395/144 |
| 5,179,718 | 1/1993 | MacPhail ................................ 707/514 |
| 5,216,720 | 6/1993 | Naik et al. .............................. 704/272 |
| 5,255,310 | 10/1993 | Kim et al. ................................ 379/88 |
| 5,274,560 | 12/1993 | LaRue ..................................... 364/444 |
| 5,283,833 | 2/1994 | Church et al. ............................ 381/41 |

(List continued on next page.)

FOREIGN PATENT DOCUMENTS

| | | |
|---|---|---|
| 0 319 193 A2 | 6/1989 | European Pat. Off. . |
| WO 96 10795 | 4/1996 | WIPO . |
| 96 36042 | 11/1996 | WIPO . |

OTHER PUBLICATIONS

L.G. Kersta; "Voiceprint Identification"; Bell Telephone Laboratories, Inc., Murray Hill, NJ; Nature; Dec. 29, 1962; pp. 1253–1257.

Joseph P. Campbell, Jr.; "Speaker Recognition: A Tutorial"; Proceedings of the IEEE; vol. 85, No. 9, Sep., 1997; pp. 1437–1462.

*Primary Examiner*—Bhavesh Mehta
*Attorney, Agent, or Firm*—Kenyon & Kenyon

[57] ABSTRACT

A method and apparatus for correcting misrecognized words appearing in electronic documents that have been generated by scanning an original document in accordance with an optical character recognition ("OCR") technique. If an incorrect word is found in the electronic document, the present invention generates at least one reference word and selects the reference word that is the most likely correct replacement for the incorrect word. This selection is accomplished by performing a probabilistic determination that assigns to each reference word a replacement word recognition probability. The probabilistic determination is carried out on the basis of a pre-stored confusion matrix that stores a plurality of probability values. The confusion matrix is used to associate each character of recognized word in the electronic document with a corresponding character of a word in the original document on the basis of these probability values.

33 Claims, 7 Drawing Sheets

U.S. PATENT DOCUMENTS

| | | | |
|---|---|---|---|
| 5,297,194 | 3/1994 | Hunt et al. | 379/88 |
| 5,303,299 | 4/1994 | Hunt et al. | 379/88 |
| 5,365,574 | 11/1994 | Hunt et al. | 379/88 |
| 5,384,833 | 1/1995 | Cameron | 704/275 |
| 5,418,717 | 5/1995 | Su et al. | 364/419.08 |
| 5,452,397 | 9/1995 | Ittycheriah et al. | 395/2.49 |
| 5,454,062 | 9/1995 | LaRue | 395/2.63 |
| 5,455,889 | 10/1995 | Bahl et al. | 704/236 |
| 5,465,290 | 11/1995 | Hampton et al. . | |
| 5,497,319 | 3/1996 | Chong et al. | 364/419.02 |
| 5,499,288 | 3/1996 | Hunt et al. | 379/88 |
| 5,502,774 | 3/1996 | Bellegarda et al. | 382/159 |
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,519,786 | 5/1996 | Courtney et al. | 382/159 |
| 5,526,465 | 6/1996 | Carey et al. | 704/250 |
| 5,535,120 | 7/1996 | Chong et al. | 364/419.03 |
| 5,566,272 | 10/1996 | Brems et al. | 704/231 |
| 5,577,164 | 11/1996 | Kaneko et al. . | |
| 5,613,109 | 3/1997 | Yamauchi et al. . | |
| 5,623,578 | 4/1997 | Mikkilineni | 704/255 |
| 5,623,609 | 4/1997 | Kaye et al. | 704/1 |
| 5,640,490 | 6/1997 | Hansen et al. | 704/254 |
| 5,642,519 | 6/1997 | Martin . | |
| 5,655,058 | 8/1997 | Balasubramanian et al. | 704/236 |
| 5,675,647 | 10/1997 | Garneau et al. | 380/20 |
| 5,675,704 | 10/1997 | Juang et al. | 704/246 |
| 5,675,706 | 10/1997 | Lee et al. | 704/256 |
| 5,677,989 | 10/1997 | Rabin et al. . | |
| 5,677,990 | 10/1997 | Junqua . | |
| 5,680,509 | 10/1997 | Gopalakrishnan et al. | 704/270 |
| 5,680,511 | 10/1997 | Baker et al. | 395/2.66 |
| 5,687,287 | 11/1997 | Gandhi et al. | 704/247 |
| 5,729,656 | 3/1998 | Nahamoo et al. | 704/254 |
| 5,745,555 | 4/1998 | Mark | 379/93.03 |
| 5,748,840 | 5/1998 | La Rue . | |
| 5,754,695 | 5/1998 | Kuo et al. . | |
| 5,764,799 | 6/1998 | Hong et al. | 382/225 |
| 5,769,527 | 6/1998 | Taylor et al. | 362/85 |
| 5,781,882 | 7/1998 | Davis et al. | 704/221 |
| 5,794,042 | 8/1998 | Terada et al. . | |
| 5,797,123 | 8/1998 | Chou et al. . | |
| 5,799,269 | 8/1998 | Schabes et al. . | |
| 5,802,205 | 9/1998 | Emico et al. | 382/187 |
| 5,806,040 | 9/1998 | Vensko . | |
| 5,818,952 | 10/1998 | Takenouch et al. . | |
| 5,829,000 | 10/1998 | Huang et al. | 704/252 |
| 5,832,063 | 11/1998 | Vysotsky et al. . | |
| 5,841,901 | 11/1998 | Arai et al. . | |
| 5,850,480 | 12/1998 | Scanlon . | |
| 5,870,492 | 2/1999 | Shimizu et al. . | |
| 5,875,108 | 2/1999 | Hoffberg et al. | 364/146 |
| 5,889,897 | 3/1999 | Medina | 382/309 |
| 5,903,864 | 5/1999 | Gadbois et al. . | |
| 5,913,196 | 6/1999 | Talmor et al. . | |
| 5,937,385 | 8/1999 | Zadrozny et al. . | |

CONFUSION MATRIX BASED METHOD AND SYSTEM FOR CORRECTING MISRECOGNIZED WORDS APPEARING IN DOCUMENTS GENERATED BY AN OPTICAL CHARACTER RECOGNITION TECHNIQUE

CROSS REFERENCE TO RELATED APPLICATIONS

The present application is related to the following commonly assigned U.S. patent applications: Ser. No. 08/763,382, filed Dec. 13, 1996, entitled "Statistical Database Correction Of Alphanumeric Account Numbers For Speech Recognition And Touch-Tone Recognition;" Ser. No. 08/771,356, filed Dec. 16, 1996, entitled "Constrained Alpha-Numerics For Accurate Account Number Recognition;" and Ser. No. 08/909,200, filed concurrently herewith, entitled "Method And Apparatus For Performing An Automatic Correction Of Misrecognized Words Produced By An Optical Character Recognition Technique By Using A Hidden Markov Model Based Algorithm."

BACKGROUND INFORMATION

The present invention is directed to a method and system for correcting misrecognized words in electronic documents that have been produced by an optical character recognition system that scans text appearing on a physical medium, and in particular, to a method and system that relies on at least one confusion matrix to select for each misrecognized word a word with the highest probability of matching the word in the original document that the misrecognized word was intended to match.

Devices that are used in conjunction with optical character recognition ("OCR") techniques have been in use for some time. Examples of such devices are optical scanners and facsimile machines. What is common to both of these types of devices is that they each scan a physical document bearing printed or handwritten characters in order to produce an electronic image of the original document. The output image is then supplied to a computer or other processing device, which performs an OCR algorithm on the scanned image. The purpose of the OCR algorithm is to produce an electronic document comprising a collection of recognized words that are capable of being edited. The electronic document may be formatted in any one of plurality of well known applications. For example, if the recognized words are to be displayed on a computer monitor, they may be displayed as a Microsoft WORD® document, a WORDPERFECT® document, or any other text-based document. Regardless of how the recognized words of the electronic document are formatted, the recognized words are intended to correspond exactly, in spelling and in arrangement, to the words printed on the original document.

Such exact correspondence, however, does not always occur; as a result, the electronic document may include misrecognized words that never appeared in the original document. For purposes of this discussion, the term "word" covers any set of characters, whether or not the set of characters corresponds to an actual word of a language. Moreover, the term "word" covers sets of characters that include not only letters of the alphabet, but also numbers, punctuation marks, and such typographic symbols as "$", "&", "#", etc. Thus, a misrecognized word may comprise a set of characters that does not comprise an actual word, or a misrecognized word may comprise an actual word that does not have the same spelling as that of the corresponding word in the scanned document. For example, the word "got" may be misrecognized as the non-existent word "qot", or the word "eat" may be recognized as "cat." Such misrecognized words, whether they comprise a real word or a mere aggregation of characters, may be quite close in spelling to the words of the original document that they were intended to match. The cause of such misrecognition errors is largely due to the physical similarities between certain characters. For example, as discussed above, such errors may occur when the letter "g" is confused with the physically similar letter "q". Another common error that OCR algorithms make is confusing the letter "d" with the two-letter combination of "ol." The physical resemblance of certain characters is not the only cause of recognition errors, however. For example, the scanning device may include a faulty optical system or a defective charge-coupled device (CCD); the original document may be printed in a hard-to-scan font; or the original document may include scribbles and marks that obscure the actual text.

Certain techniques have been implemented in order to detect and correct such misrecognition errors. For example, if the electronic document containing the recognized words is formatted in a word processing application, a user viewing the document may use the spell checking function provided by the word processing application to correct any words that have been misspelled. Some of these word processing applications also provide a grammar checker, which would identify words that, although spelled correctly, do not belong in the particular sentences in which they appear.

A drawback to these techniques is that a user must manually implement these correction techniques because spell checkers and grammar checkers operate by displaying to the user a list of possible words that may include the correct word. By manipulating an appropriate sequence of keys or other data input means, a user must select from this list what he believes to be the correct word and implement the appropriate commands for replacing the misrecognized word with the selected word. Such a correction technique is time-consuming, and moreover, is prone to human error because in carrying out such operations, the user may inadvertently select an inappropriate word to replace the misrecognized word. What is therefore needed is a correction technique that automatically replaces each misrecognized word with the word most likely matching the corresponding word in the original document. Such a correction technique would not require user intervention.

SUMMARY OF THE INVENTION

In order to overcome the above-mentioned disadvantages found in previous techniques for correcting misrecognized words, the present invention is directed to a method and apparatus that automatically substitutes each misrecognized word with a dynamically generated replacement word that has been determined to be the most likely correct word for replacing the misrecognized word. The recognized words may be based on words appearing on a physical medium (e.g., words printed on a sheet of paper) that has been optically scanned. The present invention then determines whether each recognized word is correct by executing either a spell checking algorithm, a grammar checking algorithm, a natural language algorithm, or any combination thereof. For each incorrect recognized word, the present invention generates at least one reference word; the incorrect misrecognized word is replaced by one of the reference words. In order to determine which reference word is to replace the incorrect recognized word, the present invention computes for each reference word a value that reflects the likelihood that the reference word matches the corresponding word appearing on the physical medium. The present invention replaces the incorrect recognized word with the reference word having the greatest likelihood of matching the corresponding word appearing on the physical medium.

DETAILED DESCRIPTION OF THE INVENTION

Figure 1:
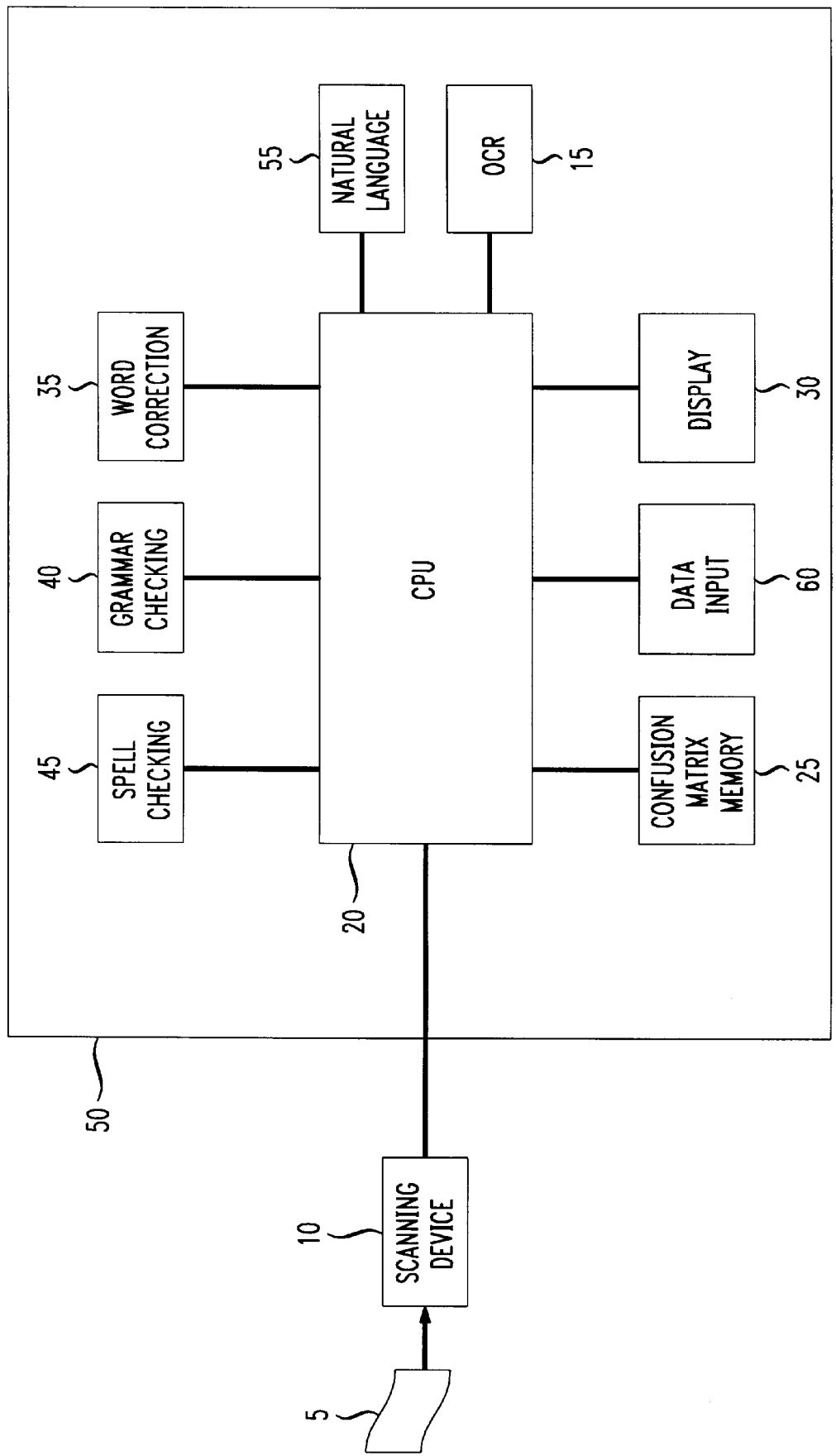
FIG. 1 illustrates a block diagram of an apparatus according to the present invention.

FIG. 1 illustrates a system that implements the word correction routine of the present invention. The system of FIG. 1 is merely an example of one kind of system that is capable of supporting the present word correction routine, and it should be appreciated that the present word correction routine is compatible with numerous other applications.

The system 100 of FIG. 1 includes a document scanning device 10, which may comprise an optical scanner or a facsimile machine. Scanning device 10 scans an input original document 5 and generates an image signal that is representative of the characters appearing on document 5. Scanning device 10 supplies the image signal to processing device 50, which may comprise a general purpose computer. Processing device 50 may be located remotely from the scanning device 10, or processing device 50 and scanning device 10 may be integrated together into a unitary apparatus, depending on the particular needs and requirements of the application in which these devices are to be implemented.

Processing device 50 includes a central processing unit 20 ("CPU"). Associated with CPU 20 are a confusion matrix memory 25, a display 30, an optical character recognition module 15, a data input device 60, a word correction module 35, a spell checking module 45, and, as an option, a grammar checking module 40 and a natural language understanding module 55. A user first inputs a document 5 into a scanning device 10, which scans the document 5 and generates an image signal representative of the scanned document. The image signal is then transmitted to CPU 20, which uses OCR module 15 to perform an optical character recognition algorithm on the received image signal. Currently, there are several software applications that can serve as OCR module 15; such software application include, but are not limited to, Pages Pro 97™ by XEROX or Paper Port™ by VISIONEER. Although these specific applications recognize only printed characters, OCR module 15 is also capable of implementing applications that recognize handwritten text.

After performing an OCR algorithm on the image signal, OCR module 15 creates an electronic document that includes recognized words intended to correspond exactly, in spelling and in arrangement, to the words of original document 5. CPU 20 may format the electronic document produced by OCR module 15 according to any one of a variety of applications. For instance, CPU 20 may format the electronic document as a WORD® document, as a WORDPERFECT® document, or as any other text-based document.

Although the recognized words of the electronic document should match all the corresponding words of the original document 5, a complete match sometimes does not occur. CPU 20 determines if there are any incorrect words in the electronic document by using a spell checking algorithm, a grammar checking algorithm, or a natural language algorithm, or any combination of the above. Any word in the electronic document that is flagged by one of these algorithms as incorrect is referred to as a misrecognized word. Each of these algorithms is capable of generating at least one alternative word for each incorrect word. These alternative words are referred to as reference words. After CPU 20 generates at least one reference word, CPU 20 implements the algorithm stored in word correction module 35 to select the reference word that is most likely the correct word for replacing the identified incorrect word. This selection is accomplished by calculating a replacement word value for each reference word. CPU 20 then replaces the incorrect word with the reference word that has been assigned the highest replacement word value.

Figure 2:
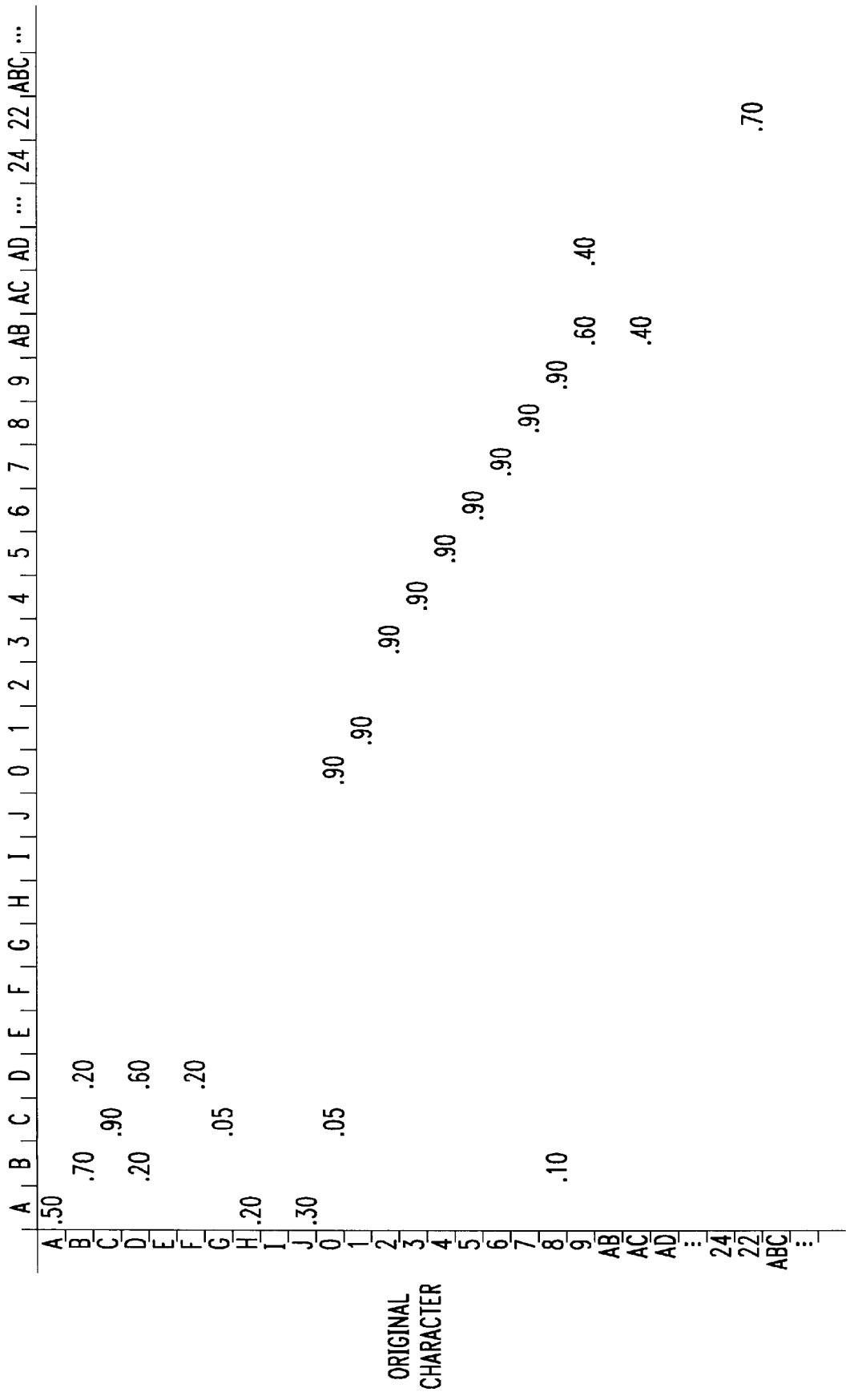
FIG. 2 illustrates a confusion matrix according to the present invention.

The algorithm stored in word correction module 35 is carried out in accordance with the contents of confusion matrix memory 25, which shall now be described in conjunction with FIG. 2. FIG. 2 illustrates a confusion matrix that is used by CPU 20 to validate the veracity of the recognized words provided by OCR module 15. Although in practice the confusion matrix stored in memory 25 would cover the entire alphabet, for the sake of simplicity and ease of understanding, the confusion matrix of FIG. 2 does not cover the entire alphabet; instead, this confusion matrix covers only the letters A–J, numerals 0–9, and certain bi-letter and tri-letter combinations, such as, for example "AB", "AC", "ABC", etc. This confusion matrix could be modified to accommodate punctuation or typographic characters, such as "$", "&", or "#". Moreover, in the example of FIG. 2, where no entry is provided, the blank entry should be read as a zero.

The confusion matrix of FIG. 2 is read as follows: the vertical columns correspond to characters of the reference words. The horizontal rows correspond to characters of words that are in document 5. Of course, the confusion matrix of FIG. 2 may be configured in reverse, in which the horizontal rows correspond to characters of the reference words, and in which the vertical columns correspond to characters that are found in document 5. The values that are provided in the confusion matrix represent different probabilities. For example, based on the confusion matrix of FIG. 2, given that the letter "A" is present in a reference word, the probability that "A" is found in the same text position in the original document 5 is 50%. For the letter "A" in the reference word, there is also a probability of 20% that "H" appears in the corresponding text position in original document 5, and there is a probability of 30% that "J" appears in document 5 when "A" was recognized. The presence of the bi-letter and tri-letter combinations in the confusion matrix is an acknowledgment that, for example, certain single characters may be misrecognized as two or three letters, or vice versa, or that certain two letter combinations may be confused as other two or three letter combinations. For example, there is a chance that OCR module 15 may misrecognize the letter "d" as "ol," or the letter "w" as "uu."

The particular probabilities that are provided in FIG. 2 are determined in advance through experimentation, and they are tailored to suit the particular OCR module 15 that is used in the system of FIG. 1. Thus, before a particular OCR module is to be used in the system of FIG. 1, a confusion matrix corresponding to that particular OCR module must first be populated. This is done by having the OCR module recognize a test group of documents, all of which are available in their original forms as electronic documents. This test group of documents may number in the thousands, differing in fonts and other printing styles. A hard copy of each test document is printed out and supplied to a scanner, which then supplies an image signal based on the scanned hard copy to the OCR module. The OCR module generates an electronic document comprising a plurality of recognized words that is intended to match, in spelling and in arrangement, the words of the scanned hard copy of the test document.

At this point, there are two electronic documents, one comprising the original test document, and another corresponding to the text recognition output of the OCR module, which is intended to match the contents of the test document. In order to evaluate how well the electronic document generated by the OCR module matches the original test document, a well-known alignment algorithm is executed. The alignment algorithm determines where there is an exact correspondence between the two documents and where there is a mismatch. The types of mismatches that the alignment algorithm detects include those that result when the OCR module erroneously deletes a letter from or adds a letter to a word of the test document, or when the OCR module erroneously replaces a letter of an original word with another letter. For each row and column in the confusion matrix, the recognition errors are tallied and normalized in order to yield a set of probabilities, an example of which is illustrated in FIG. 2. Of course, other values or scores may be used in place of probabilities when populating a confusion matrix, so long as these values or scores are capable of representing the chance that one character or combination of characters has been recognized as another character or combination of characters. The different types of entries that can be entered into a confusion matrix are referred to as character values.

Since different OCR modules exhibit different recognition accuracies, if OCR module 15 is to be replaced with a different OCR module, then a confusion matrix corresponding to the replacement OCR module must be populated and entered into memory 25. Or alternatively, memory 25 may store in advance a plurality of predetermined confusion matrices corresponding to different OCR modules, so that when a replacement OCR module is implemented, the corresponding confusion matrix may be selected by entering a command through input device 60. It should be noted that the probabilities (or other types of values) used to populate a confusion matrix need not be arranged in matrix form, but may be arranged as an array, or as any other data structure capable of associating a recognized and input character in terms of a probability.

Figure 3:
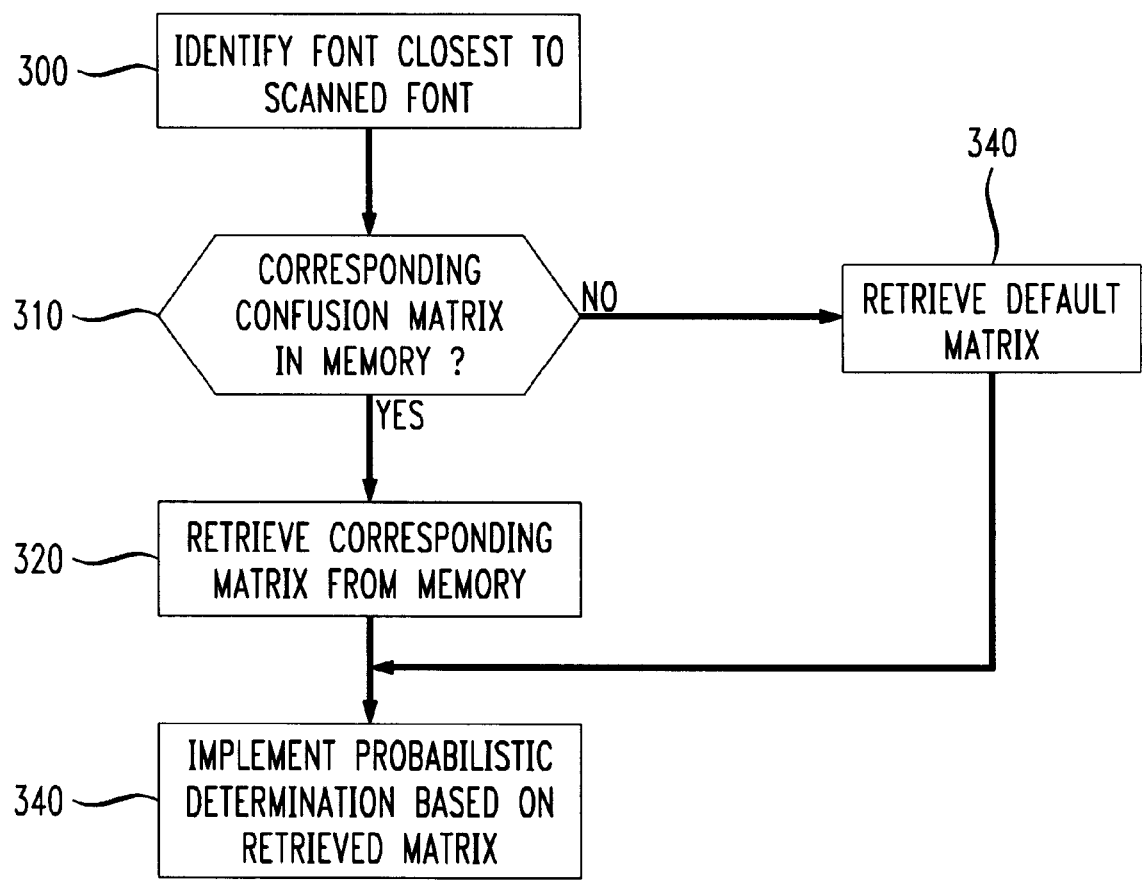
FIG. 3 illustrates a flow diagram for selecting a confusion matrix corresponding to the font of the words printed on a scanned document.

Besides storing a plurality of confusion matrices corresponding to different OCR modules, confusion matrix memory 25 may also store a plurality of confusion matrices corresponding to a plurality of different fonts, including fonts relating to hand-written text. Having a different confusion matrix for each possible font is desirable because the recognition accuracy of a particular OCR module may vary depending on the font used to print the characters on the original document 5. As illustrated by the flow diagram of FIG. 3, OCR module 15 may be programmed to identify a font that is closest to the font of the printed characters appearing in document 5 (step 300). This ability to select a font closest to that of the scanned document is a feature that is common in OCR software. Based on the selected font, the word correction module 35 determines whether confusion matrix memory 25 stores a corresponding confusion matrix (step 310). If such a corresponding matrix is stored in confusion matrix memory 25, it is retrieved (step 320) and the probabilistic routine of word correction module 35 is implemented using this retrieved confusion matrix (step 340). If confusion matrix memory 25 does not store a confusion matrix corresponding to the selected font, then word correction module 35 retrieves from confusion matrix memory 25 a default confusion matrix (step 330), which is designed to exhibit the properties of a variety of fonts. The operation of the word correction module 35 then proceeds on the basis of this default confusion matrix (step 340).

Figure 4:
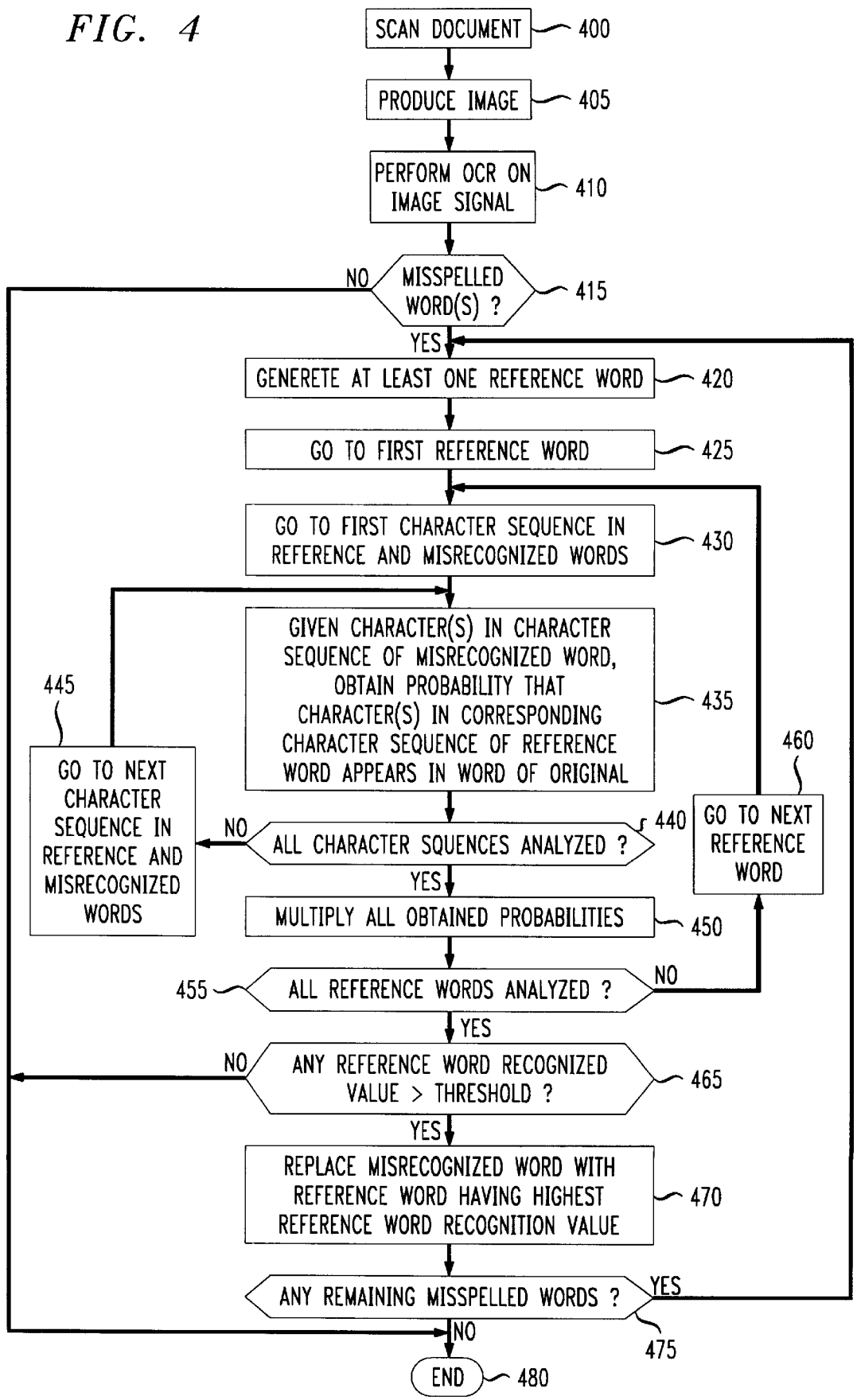
FIG. 4 illustrates a flow diagram for replacing a misrecognized word with a reference word according to a first embodiment of the present invention.

The flowcharts of FIG. 4–7 illustrate the operation of CPU 20 in accordance with various word correcting algorithms stored in module 35. Depending on the particular implementation, CPU 20 may select among these stored routines either automatically or based on a command that is manually entered through data input device 60. FIG. 4 illustrates a flow diagram relating to one type of probabilistic determination performed by the present invention. First, an original document is scanned by scanning device 10 (step 400). The scanning device 10 generates an image signal that is intended to be a complete and accurate representation of the characters contained in the scanned document 5 (step 405). The image signal is relayed to processing device 50, and CPU 20 executes on the received image signal an OCR algorithm that is maintained in OCR module 15 (step 410). The OCR module 15 produces an electronic document comprising a plurality of words that are intended to match the words of the original document 5. CPU 20 then executes on the electronic document a spell checking algorithm maintained in module 45 (step 415), which determines if any recognized words have been misrecognized by being misspelled. The spell checking algorithm may correspond to the conventional spell checking functions that are available in such word processing applications as WORD® or WORDPERFECT®. Those spell checking functions typically compare each word in a document to a pre-stored dictionary of words. If a word in the electronic document is not found in this dictionary, the spell checking function generates from the dictionary at least one reference word, each reference word having a spelling that is similar to the word that is not in the dictionary. Thus, returning to FIG. 4, after identifying a misrecognized word in the electronic document, the spell checking algorithm generates at least one reference word; this reference word or words are words that most closely match the spelling of the misrecognized word (step 420). If no word is identified as misrecognized, CPU concludes this operation (step 480).

Assume that one of the words in the original document 5 is "bet", but that it has been misrecognized by the OCR module as "fet". Having identified "fet" as a misrecognized word because it is misspelled, spell checking module 45 would then generate at least one reference word. In this example, assume that the generated reference words are "bet", "get," and "jet."

In typical spell checking operations, a user selects from the list of reference words the word he believes should replace the misrecognized word. This selection is performed manually, typically by manipulating a mouse or a sequence of keys on a keyboard. The system 100 eliminates this manual selection by automatically selecting, based on a probabilistic determination, what word most likely is the best choice for replacing the misrecognized word. CPU 20 accomplishes this probabilistic determination by executing the algorithm stored in word correction module 35.

After CPU 20 selects an appropriate confusion matrix by using one of the techniques described above in connection with FIG. 3, word correction module 35 goes to the first reference word provided by spell checking module 45, for example, "get" (step 425). CPU 20 next goes to the first character sequence in the misrecognized and reference words (step 430). The word correction module 35 is programmed to compare each character sequence in the reference word with a corresponding character sequence in the misrecognized word. Each character sequence comprises at least one character position. For example, if in the first iteration of this algorithm the character sequence length is set at two characters for both the misrecognized word and the reference word, then CPU 20 would determine the probability that "ge" appears in document 5, given that "fe" was recognized. As stated above, this multi-character combination is possible because the confusion matrix is programmed to account for bi- and tri-character combinations. For this example, assume that CPU 20 is programmed to perform this operation on a character-by-character basis, so that each character sequence is one character in length. Thus, the first character of the misrecognized word "fet" is "f", and the first character in the first reference word "get" is "g". Given that "f", the first character in the misrecognized word, was recognized, CPU 20 determines from the confusion matrix the probability that "g" appeared in the same place in document 5 (step 435). As explained before, the probabilities maintained in the confusion matrix are only one type of character value that can populate the confusion matrix. Further, the confusion matrix used may be one that encompasses letters, numbers, or other typographic symbols, or any combination thereof. Moreover, in practice, the present invention compares all possible character sequences of the reference word with all possible character sequences of the recognized word. Thus, for example, the first character in the recognized word may be compared to the first three characters of the reference word, or the first two characters of the recognized word may be compared to the first three characters of the reference word. The above example discussed in connection with FIG. 4 is merely an exemplary way of explaining the concept of comparing character sequences in the recognized word with character sequences of the reference word.

After obtaining such a probability from the confusion matrix, CPU 20 determines whether all the character sequences of the reference and misrecognized words have been analyzed (step 440). If not, CPU 20 moves to the next character sequence, which in this example is the next character position for both the misrecognized and reference words (step 445), and consults the confusion matrix again to determine the probability of recognizing the particular character of the misrecognized word when the corresponding character of the reference word appeared in the document 5. This procedure is carried out until a probability is determined for every character sequence. After the last character sequences have been analyzed, CPU 20 multiplies all the obtained probabilities for each character sequence (step 450). The result of this multiplication represents, given that the misrecognized word was recognized, the probability that the reference word used in this iteration actually appeared in the document 5. This probability is referred to as reference word recognition value, which is one example of a replacement word value. Another type of replacement word value, which is referred to as a composite value, is discussed in connection with FIGS. 5 and 6. Of course, the reference word recognition value may be determined in ways other than by multiplying the confusion matrix probabilities. The present invention is deemed to encompass alternative methods of determining reference word values that are based on probabilities, scores, or other value entries used to populate the confusion matrix. In the example given above, given that "fet" is recognized, the probability that "get" appeared in the document 5 may be determined to be 70% based on the confusion matrix that is used. After determining this probability, CPU 20 determines if any more reference words remain to be analyzed (step 455). If more reference words remain, CPU 20 then goes to the next reference word (step 460), and repeats steps 430–450 to obtain another reference word recognition value for the next reference word. This process is repeated until a reference word recognition value has been determined for every reference word in the list provided by spell checking module 45.

Once all of these reference word recognition values have been determined, CPU 20 determines which, if any, of these reference word recognition values exceeds a predetermined threshold value (step 465). This threshold value is empirically determined, and it signifies the probability level below which an associated reference word could not plausibly be considered as a replacement for the misrecognized word. If no reference word is associated with a reference word recognition value higher than the predetermined threshold, then the misrecognized word is not replaced and CPU 20 concludes its operation (step 480). If at least one reference word recognition value exceeds the threshold, CPU 20 then deletes the misrecognized word from the electronic document and replaces it with the reference word having the highest reference word recognition value (step 470). In the example provided, if "get" was the reference word with the highest reference word recognition value, then CPU 20 would replace the misrecognized word "fet" in the electronic document created by OCR module 15. After replacing the misrecognized word with the reference word having the highest reference word recognition value, CPU 20 determines from spell checking module 45 whether there are more misspelled words in the electronic document (step 475). If no further misspelled words exist in the document, then CPU 20 concludes its word correction operation (step 480); if at least one more misrecognized word appears in the document, CPU 20 goes back to step 420 and runs through steps 420–490 again. It should be appreciated that selecting the reference word with the highest probability is not the only way to select the reference word that most likely matches the corresponding word in the original document 5. The present invention is intended to encompass techniques relying on other probabilistic determinations to select such a reference word.

Figure 5:
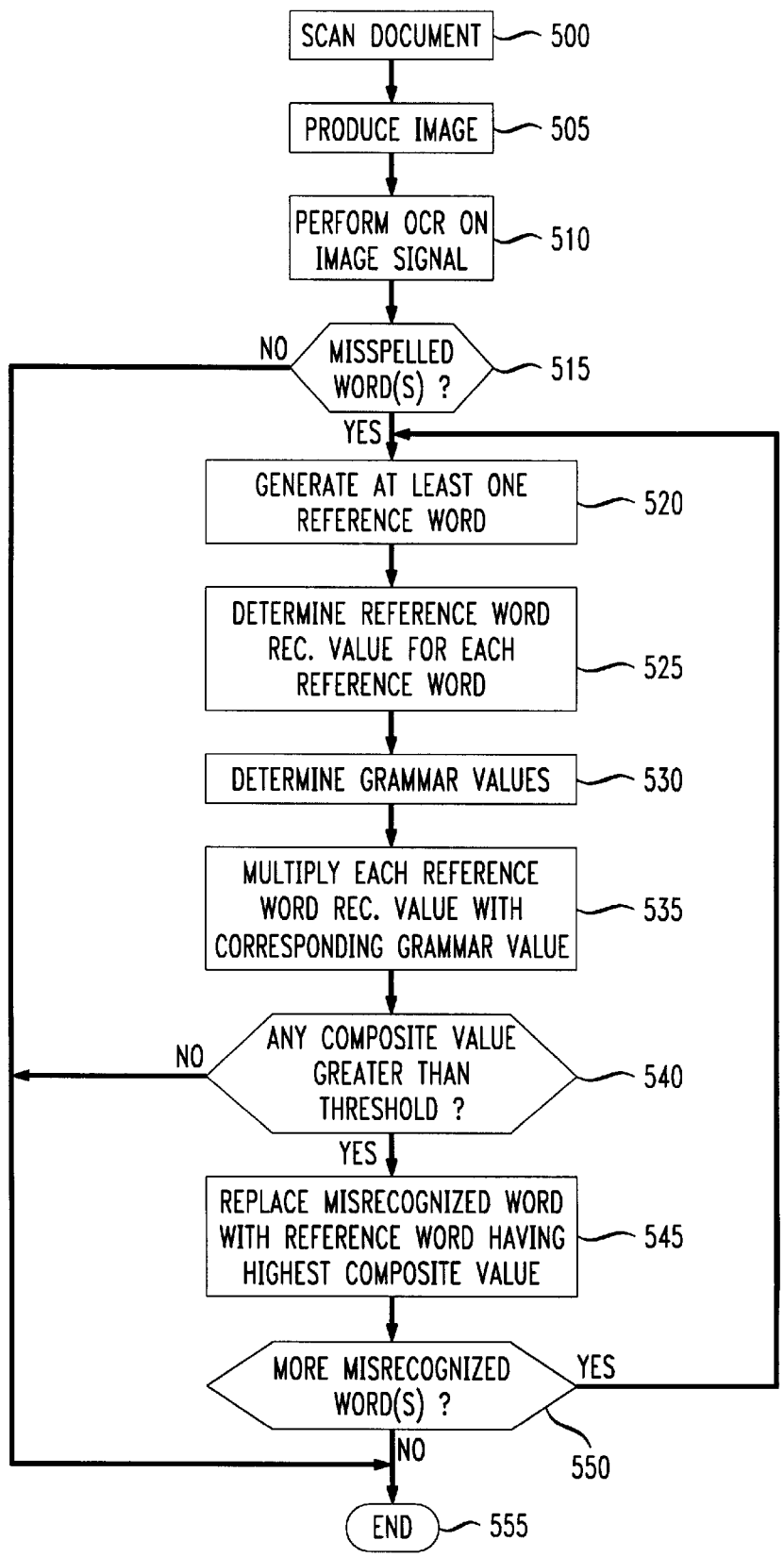
FIG. 5 illustrates a flow diagram for replacing a misrecognized word with a reference word according to a second embodiment of the present invention.

FIG. 5 illustrates another embodiment of the present invention. In addition to executing a spell checking routine on the electronic document produced by OCR module 15, this embodiment also implements a grammar checking algorithm that is maintained in grammar checking module 40. As with the algorithm of FIG. 4, the algorithm of FIG. 5 begins when an original document 5 is scanned by scanning device 10 (step 500). After an image signal of the document 5 is produced (step 505) and an OCR algorithm is performed on this image signal (step 510), CPU 20 uses spell checking module 45 to determine if any words in the recognized electronic document created by the OCR module have been misrecognized by being misspelled (step 515). If CPU 20 does not detect any such words, then the operation ends (step 555). On the other hand, if at least one misrecognized word is detected in the electronic document, then for each misrecognized word, spell checking module 45 generates at least one reference word that most closely matches the spelling of the misrecognized word (step 520).

After using spell checking module 45 to generate the at least one reference word, CPU 20 determines a reference word recognition value for each reference word in the same manner as steps 425–455 of FIG. 4 (step 525). CPU 20 then executes a grammar checking algorithm stored in module 40; as with the spell checking algorithm of module 45, this grammar checking algorithm is also commonly available in such typical word processing applications as WORD® or WORDPERFECT®. The grammar checking algorithm analyzes the sentence in which the misrecognized word appears and determines what form of speech should occupy the text position of the misrecognized word. For example, if the sentence that includes the misrecognized word reads "I want to ride on the fet," then for misrecognized word "fet", the grammar checking algorithm determines that the correct word is 90% likely to be a noun, 5% likely to be a verb, and 5% likely to be an adjective (step 530). The grammar checking algorithm is not limited to generating only probabilities for each part of speech; instead, the grammar checking algorithm is capable of generating other types of scores or values that reflect the relative likelihood of a particular word belonging to a particular part of speech. Returning to FIG. 5, the CPU 20 multiplies the reference word recognition values obtained in step 530 for each reference word with the corresponding grammar value (step 535). In this example, assume that for the misrecognized word "fet," spell checking module 45 provided a list of reference words that includes "get," "let," and "jet." Also assume that from the confusion matrix of memory 25, these reference words were assigned reference word recognition values as follows: "get"—30%, "let"—50%, "jet"—40%. CPU 20 then multiplies each reference word recognition value with the grammar value that corresponds to the form of speech of the associated reference word (step 535). The product of this multiplication produces what is referred to as a composite value, which is another type of replacement word value. Since the word "get" is a verb, its reference word recognition value of 30% is multiplied by the determined verb value for this context, which is 5%. This multiplication yields a 1.5% composite value that the correct word for replacing "fet" is "get". Similarly, step 535 yields a 2.5% composite value that the correct word is "let" and a 36% composite value that the correct word is "jet." CPU 20 then discards which composite values, if any, do not exceed a predetermined threshold value (step 540). If none of the composite values exceeds the predetermined threshold, then CPU 20 keeps the misrecognized word in the electronic document and concludes its operation (step 555). Assuming, however, that some of the composite values do in fact exceed the predetermined threshold, CPU 20 deletes the misrecognized word from the electronic document and replaces it with the reference word that is associated with the highest of these composite probabilities (step 545). In this example, CPU 20 replaces "fet" with "jet". If there are more misrecognized words (step 550), CPU 20 returns to step 520; if not, CPU 20 concludes its operation (step 555).

Figure 6:
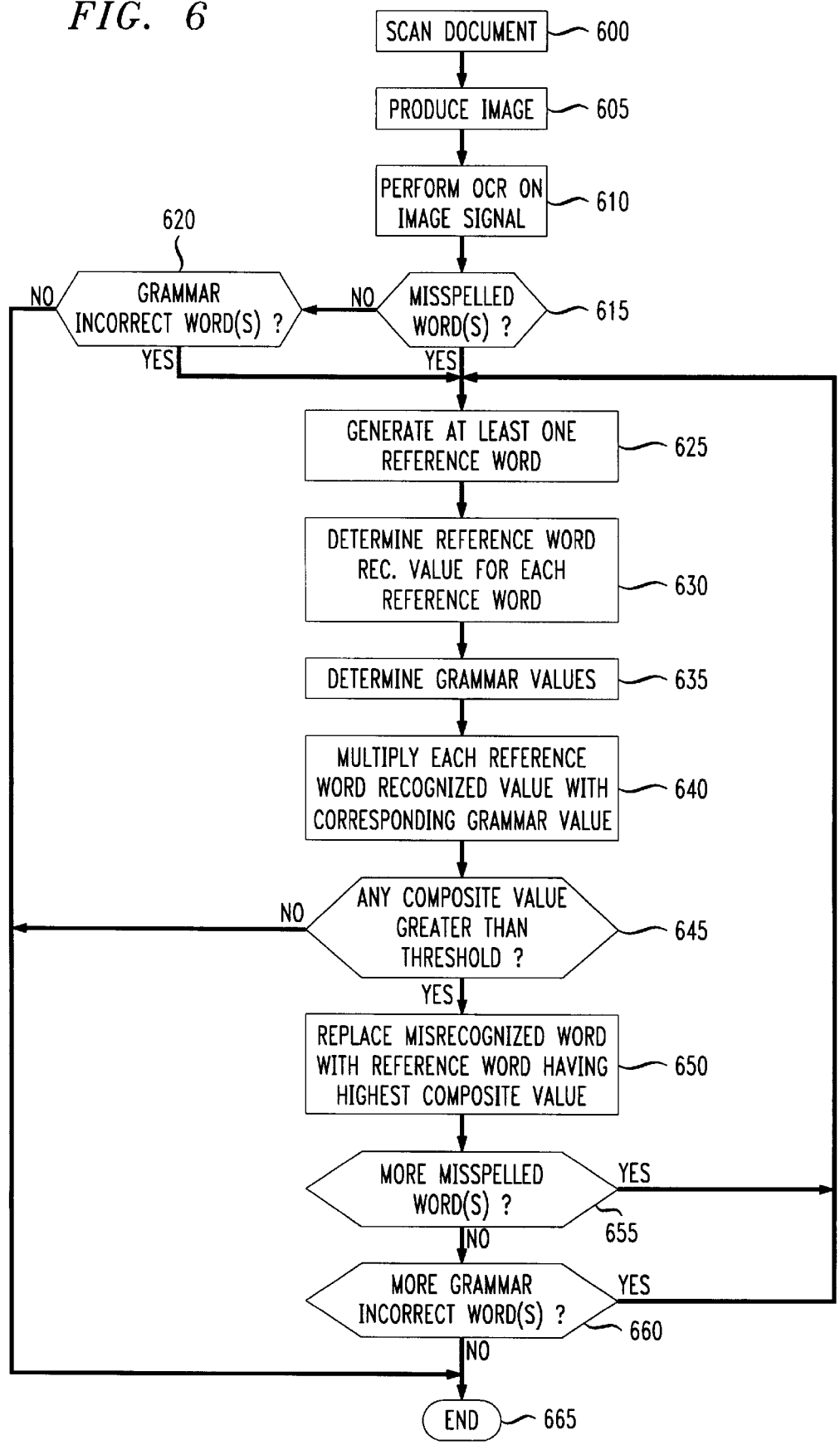
FIG. 6 illustrates a flow diagram for replacing a misrecognized word with a reference word according to a third embodiment of the present invention.

FIG. 6 illustrates another possible algorithm that may be maintained in word correction module 35. This algorithm addresses the situation in which the electronic document produced by OCR module 15 includes no misspelled words, but does include grammatically incorrect words. As with the previously described algorithms, the operation represented in FIG. 6 begins with scanning an original document 5 (step 600), producing an image signal based on the scanned document (step 605), and performing an OCR algorithm on the image signal (step 610). CPU 20 then uses the spell checking module 45 to determine if any words in the electronic document are not found in the spell checking module's dictionary (step 615). If misspelled words are determined to exist in the electronic document, then the operation of FIG. 6 follows the same steps illustrated in FIG. 5. That is, the spell checking module 45 generates at least one reference word, and CPU 20, based on the word correction algorithm of module 35, determines a reference word recognition value for each reference word. CPU 20 then obtains a plurality of grammar values in the manner explained above and multiplies each of the reference word recognition values with a corresponding grammar value in order to arrive at a composite value for each reference word. CPU 20 then deletes the misspelled word from the electronic document and replaces it with the reference word corresponding to the highest composite probability.

If, however, in step 615, no misspelled words are detected in the electronic document, then CPU 20 uses the grammar checking algorithm to determine if any words in the document are grammatically incorrect (step 620). If no grammatically incorrect words are detected, then CPU 20 concludes its word correction operation (step 665). Assume, however, that in the electronic document the following grammatically incorrect sentence appears: "I want to fat a cake." Obviously, the grammatically incorrect word in this sentence, "fat", should be changed to "eat", but spell checking module 45 would not flag such a word because "fat" is a correctly spelled word. That is why it is necessary to perform a grammar check in step 620 to analyze the grammatical structure of each sentence in the electronic document. After performing such an analysis on the sentence in this example, CPU 20 would detect that the text position occupied by "fat" most likely should be a verb, not an adjective. After flagging the word "fat" as grammatically incorrect, CPU 20 would then cause the dictionary search module of the spell checking algorithm to generate at least one reference word in the same manner discussed above (step 625). Alternatively, the grammar checking algorithm could be provided with its own dictionary search module. After determining reference word recognition values for each reference word in the same manner as in FIG. 4 (step 630), CPU 20 would cause grammar module 40 to generate a plurality of grammar values; for instance, the grammar checking algorithm may determine that for the text position occupied by the word "fat", there is an 85% chance that the correct word is a verb, a 10% chance that it is a noun, and a 5% chance that it is an adjective (step 635). Each reference word recognition value would be multiplied by the grammar value corresponding to the part of speech of the associated reference word (step 640), and, assuming at least some of the resulting composite values exceed a predetermined threshold (step 645), the grammatically incorrect word would be replaced by the reference word associated with the highest composite value (step 650).

Figure 7:
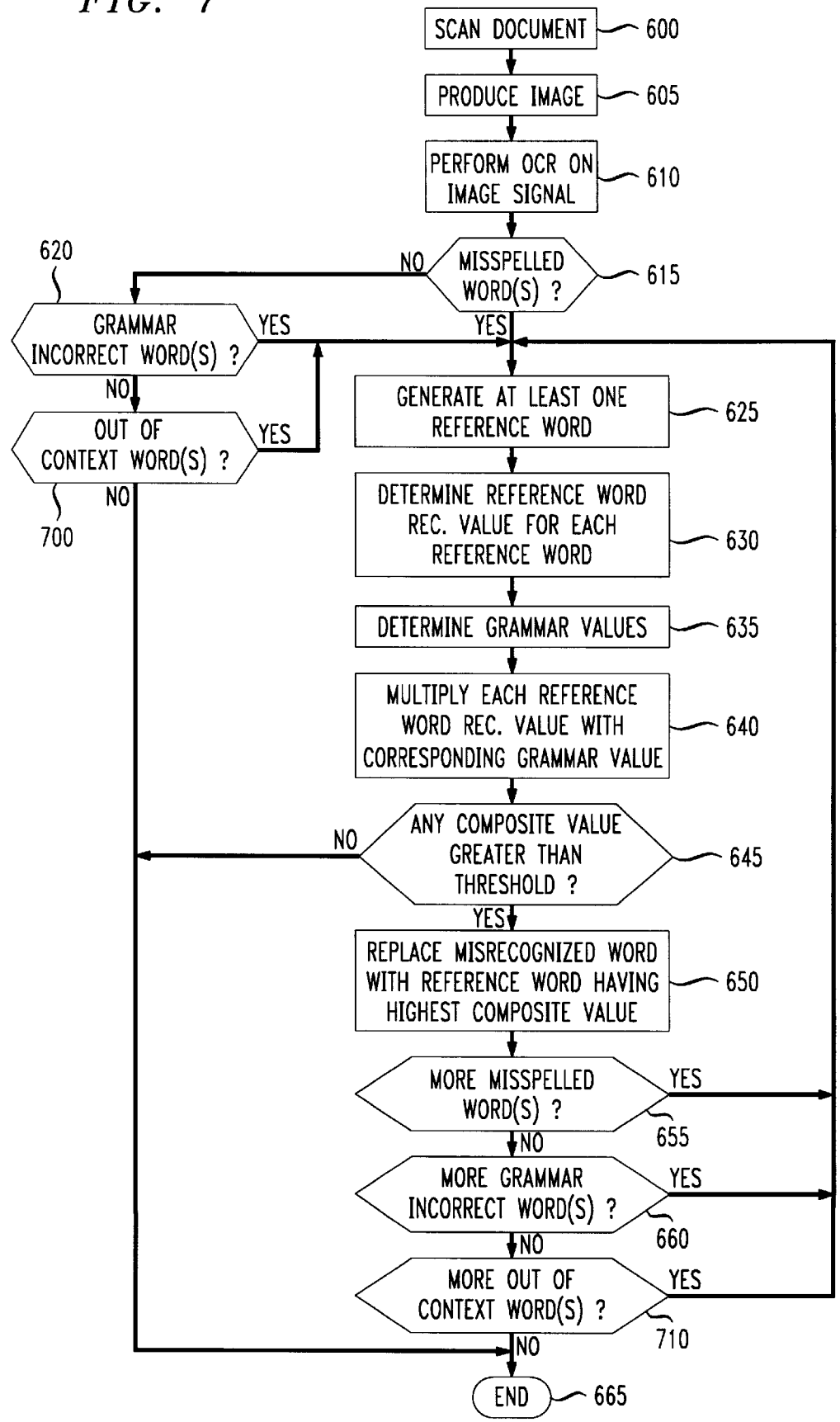
FIG. 7 illustrates a flow diagram for replacing a misrecognized word with a reference word according to a fourth embodiment of the present invention.

CPU 20 also may employ a natural language understanding algorithm, which is maintained in module 55 and which may correspond to NL ASSISTANT™ natural language application by UNISYS CORPORATION. What is common to all of these natural language algorithms is that they each can flag words that, although grammatically correct, are nevertheless out of context. For example, if the recognized sentence is "I hit the baseball with my cat", neither the spell checking algorithm nor the grammar checking algorithm would determine that "cat" is incorrect and should be changed to "bat". Because the natural language algorithm analyzes the context within which each word appears, it would determine that the word "cat" does not belong in the sentence. As a consequence, a list of reference words would be generated, one of which would presumably be "bat". CPU 20 would then generate for each word in this list a reference word recognition value (and, if desirable, a composite value) in the same manner as in the previous embodiments. With respect to the algorithm of FIG. 6, a natural language algorithm may be implemented as an additional step after the grammar check step 620 (step 700). Thus, a recognized word would first be analyzed for spelling, then grammar, and then context, and if any of these checking algorithms flags the recognized word as incorrect, then at least one reference word would be generated (step 625) and the word checking algorithm would proceed in the same manner as discussed above. This modification of FIG. 6 is shown in FIG. 7.

As is evident from this discussion, the present invention is broadly directed to a word correction system that replaces each misrecognized word with a word that most likely matches the corresponding word in an original document. This system is thus compatible with any recognition technique that is capable of generating a set of words from which the most likely replacement for the misrecognized word is selected. Moreover, as explained before, the present invention may be used in conjunction with a wide variety of applications for detecting misrecognized words. Thus, the present invention is capable of detecting misrecognized words on the basis of a spell checking algorithm, a grammar checking algorithm, a natural language algorithm, or any combination thereof.

What is claimed is:

1. A method of recognizing at least one word in a document, the word including at least one predetermined character, the method comprising the steps of:
   a) providing a recognized word based on the word in the document;
   b) determining whether the recognized word is correct;
   c) generating, if the recognized word is incorrect, at least one reference word, each reference word comprising a different set of predetermined characters and being generated according to a process that is independent of a content of at least one confusion matrix;
   d) determining for each reference word a corresponding replacement word value based on a calculation involving a mathematical function being applied to a content of the at least one confusion matrix; and
   e) replacing the incorrect recognized word with the reference word most likely matching the at least one word in the document based on the corresponding replacement word value.

2. The method according to claim 1, wherein each one of the at least one word in the document, the recognized word, and each reference word comprises at least one alphanumeric character.

3. The method according to claim 1, wherein each one of the at least one word in the document, the recognized word, and each reference word comprises at least one number.

4. The method according to claim 1, wherein each one of the at least one word in the document, the recognized word, and each reference word comprises at least one alphabetical letter.

5. The method according to claim 1, wherein each one of the at least one word in the document, the recognized word, and each reference word comprises at least one typographic character.

6. The method according to claim 1, wherein:
   the step b) comprises determining whether the recognized word is spelled correctly,
   the at least one confusion matrix includes a plurality of character values, and
   the step d) comprises, if the recognized word is spelled incorrectly:
      i) obtaining, for each character sequence in each one of the at least one reference word, a character value representing a likelihood that the character sequence of the at least one reference word is recognized as the corresponding character sequence in the incorrectly spelled recognized word, wherein each of the character sequence of the at least one reference word and the character sequence of the incorrectly spelled recognized word comprises at least one character position, respectively,
      ii) establishing a reference word recognition value based on the obtained character values, and
      iii) repeating steps i) and ii) for each reference word, each reference word being associated with a corresponding reference word recognition value, each replacement word value comprising a corresponding reference word recognition value.

7. The method according to claim 6, wherein each of the obtained character values is a probability.

8. The method according to claim 6, wherein each reference word recognition value is established by multiplying the character values obtained for the corresponding reference word.

9. The method according to claim 1, wherein each one of the at least one confusion matrix corresponds to a different font.

10. The method of claim 1, wherein the at least one word in the document comprises a printed word appearing on a physical document.

11. The method of claim 1, wherein the at least one word in the document comprises a handwritten word appearing on a physical document.

12. The method according to claim 1, wherein the recognized word is provided by an optical character recognition technique.

13. The method according to claim 1, wherein the reference word selected in step e) to replace the incorrect recognized word corresponds to the highest replacement word value determined in step d).

14. The method according to claim 1, wherein:
   the at least one confusion matrix includes a plurality of character values, and
   the step d) comprises, if the recognized word is incorrect:
      i) obtaining, for each character sequence in the at least one reference word, a character value representing a likelihood that the character sequence of the at least one reference word is recognized as the corresponding character sequence in the incorrect recognized word, wherein each of the character sequence of the at least one reference word and the character sequence of the incorrect recognized word comprises at least one character position,
      ii) establishing a reference word recognition value based on the obtained character values,
      iii) generating a plurality of grammar values based on the incorrect recognized word, each grammar value corresponding to a different part of speech, iv) determining for the reference word a composite value based on the corresponding reference word recognition value and on one of the plurality of grammar values corresponding to the part of speech of the reference word, and v) repeating steps i)–iv) for each reference word, each reference word being associated with a corresponding composite value, and each replacement word value comprising a corresponding composite value.

15. The method according to claim 14, wherein the step b) comprises:

vi) determining whether the recognized word is incorrectly spelled by determining whether the recognized word is found in a prestored dictionary maintained in memory, and vii) determining, if the recognized word is correctly spelled, whether the recognized word is grammatically correct.

16. The method according to claim 15, wherein the step b) further comprises determining, if the recognized word is spelled correctly and is grammatically correct, whether the recognized word is contextually correct.

17. The method according to claim 1, further comprising the steps of:

providing a plurality of word correction modules, each word correction module being associated with a different confusion matrix;

selecting one of the plurality of word correction modules; and performing at least step d) in accordance with the confusion matrix associated with the selected word correction module.

18. A method of recognizing at least one word in a document, the word including at least one predetermined character, the method comprising the steps of:

a) providing a recognized word based on the word in the document;

b) determining whether the recognized word is correct;

c) providing, if the recognized word is incorrect, at least one reference word, each reference word comprising a different set of predetermined characters;

d) determining for each reference word a corresponding replacement word value based on a calculation derived from a content of at least one confusion matrix; and e) replacing the incorrect recognized word with the reference word most likely matching the at least one word in the document based on the corresponding replacement word value, wherein:

the at least one confusion matrix includes a plurality of character values the step d) comprises, if the recognized word is incorrect:

i) obtaining for each character sequence in the at least one reference word, a character value representing a likelihood that the character sequence of the at least one reference word is recognized as the corresponding character sequence in the incorrect recognized word, wherein each of the character sequence of the at least one reference word and the character sequence of the incorrect recognized word comprises at least one character position, ii) establishing a reference word recognition value based on the obtained character values, iii) generating a plurality of grammar values based on the incorrect recognized word, each grammar value corresponding to a different part of speech, iv) determining for the reference word a composite value based on the corresponding reference word recognition value and on one of the plurality of grammar values corresponding to the part of speech of the reference word, and v) repeating steps i)–iv) for each reference word, each reference word being associated with a corresponding composite value, and each replacement word value comprising a corresponding composite value, each reference word recognition value is established by multiplying the character values obtained for the corresponding reference word, and each composite value is determined by multiplying each reference word recognition value with one of the plurality of grammar values corresponding to the part of speech of the associated reference word.

19. A method of recognizing at least one word in a document, the word including at least one predetermined character, the method comprising the steps of:

a) providing a recognized word based on the word in the document, b) determining whether the recognized word is correct, c) providing, if the recognized word is incorrect, at least one reference word, each reference word comprising a different set of predetermined characters, d) determining for each reference word a corresponding replacement word value based on a calculation derived from a content of at least one confusion matrix; and e) replacing the incorrect recognized word with the reference word most likely matching the at least one word in the document based on the corresponding replacement word value, wherein before the step e), the method further comprises the step of determining whether any of the at least one reference word is associated with a replacement word value higher than a predetermined threshold, and wherein the reference word used to replace the incorrect recognized word in step e) is associated with a replacement word value that is higher than the predetermined threshold.

20. An apparatus for recognizing at least one word in a document, the word including at least one predetermined character, the apparatus comprising:

means for providing a recognized word based on the word in the document;

first determining means for determining whether the recognized word is correct;

means for generating if the recognized word is incorrect, at least one reference word, each reference word comprising a different set of predetermined characters and being generated according to a process that is independent of a content of at least one confusion matrix;

second determining means for determining for each reference word a corresponding replacement word value based on a calculation involving a mathematical function being applied to a content of the at least one confusion matrix; and means for replacing the incorrect recognized word with the reference word most likely matching the at least one word in the document based on the corresponding replacement word value.

21. The apparatus according to claim 20, wherein:

the first determining means comprises means for determining whether the recognized word is spelled correctly, the at least one confusion matrix includes a plurality of character values and the second determining means comprises:

means for obtaining, for each character sequence in each one of the at least one reference word, a character value representing a likelihood that the character sequence of the at least one reference word is recognized as the corresponding character sequence in the incorrectly spelled recognized word, wherein each of the character sequence of the at least one reference word and the character sequence of the incorrectly spelled recognized word comprises at least one character position, respectively, and means for establishing a reference word recognition value based on the obtained character values.

22. The apparatus according to claim 21, further comprising a memory for arranging the obtained character values as the at least one confusion matrix.

23. The apparatus according to claim 20, wherein:

the at least one confusion matrix includes a plurality of character values and the second determining means comprises:

means for obtaining, for each character sequence in the at least one reference word, a character value representing a likelihood that the character sequence of the at least one reference word is recognized as the corresponding character sequence in the incorrect recognized word, wherein each of the character sequence of the at least one reference word and the character sequence of the incorrect recognized word comprises at least one character position, means for establishing a reference word recognition value based on the obtained character values, means for generating a plurality of grammar values based on the incorrect recognized word, each grammar value corresponding to a different part of speech, and means for determining for the reference word a composite value based on the corresponding reference word recognition value and on one of the plurality of grammar values corresponding to the part of speech of the reference word.

24. The apparatus according to claim 23, wherein the first determining means comprises:

means for determining whether the recognized word is incorrectly spelled by determining whether the recognized word is found in a pre-stored dictionary maintained in memory, and means for determining whether the recognized word is grammatically correct.

25. The apparatus according to claim 24, wherein the first determining means for further comprises determining whether the recognized word is contextually correct.

26. The apparatus according to claim 20, further comprising:

means for providing a plurality of word correction modules, each word correction module being associated with a different confusion matrix;

means for selecting one of the plurality of word correction modules; and means for causing the second determining means to determine each replacement word value in accordance with the confusion matrix associated with the selected word correction module.

27. An apparatus for recognizing at least one word in a document, the word including at least one predetermined character, the apparatus comprising:

a scanning device for providing a recognized word based on the word in the document; and a processing device in communication with the scanning device, wherein the processing device comprises:

a central processing unit, an optical character recognition module in communication with the control processing unit, a confusion matrix memory in communication with the central processing unit, a word checking module in communication with the central processing unit and for generating a reference word according to a process that is independent of a content of the confusion matrix memory, and a word correction module in communication with the central processing unit, wherein, if the central processing unit operating in accordance with the word checking module determines that the recognized word is incorrect, the central processing unit, operating in accordance with the word correction module and a content of the confusion matrix memory, replaces the recognized with a reference word associated with a replacement word value generated in accordance with a calculation involving a mathematical function being applied to the content of the confusion matrix memory.

28. The apparatus according to claim 27, wherein the word checking module comprises at least one of a spell checking module, a grammar checking module, and a natural language module.

29. The apparatus according to claim 28, wherein the processing device further comprises:

a data input device in communication with the central processing unit; and a display device in communication with the central processing unit.

30. An apparatus for recognizing at least one word in a document, the word including at least one predetermined character the apparatus comprising:

a scanning device for providing a recognized word based on the word in the document; and a processing device in communication with the scanning device, wherein the processing device comprises:

a central processing unit, an optical character recognition module in communication with the control processing unit, a confusion matrix memory in communication with the central processing unit, a word checking module in communication with the central processing unit, a word correction module in communication with the central processing unit, a data input device in communication with the central processing unit, and a display device in communication with the central processing unit, wherein:

if the central processing unit operating in accordance with the word checking module determines that the recognized word is incorrect, the central processing unit, operating in accordance with the word correction module and a content of the confusion matrix memory replaces the recognized with a reference word associated with a replacement word value generated in accordance with the content of the confusion matrix memory, the word checking module comprises at least one of a spell checking module, a grammar checking module, and a natural language module, the confusion matrix memory stores a plurality of confusion matrices, the data input device includes a selecting device for selecting one of the plurality of confusion matrices, and the reference word is generated in accordance with the selected confusion matrix.

31. A method of recognizing at least one word in an original document, the word including at least one predetermined character, the method comprising the steps of:

a) providing a first displayable electronic document including at least a recognized word based on the word in the original document;

b) applying a word error detection application to the first displayable electronic document to determine whether the recognized word is correct; and c) if the recognized word is incorrect, performing the steps of:

d) providing at least one reference word, each reference word comprising a different set of predetermined characters, e) determining for each reference word a corresponding replacement word value, and f) providing a second displayable electronic document in which the incorrect recognized word is replaced with the reference word most likely matching the at least one word in the original document based on the corresponding replacement word value.

32. An apparatus for recognizing at least one word in an original document, the word including at least one predetermined character, the apparatus comprising:

means for providing a first displayable electronic document including at least a recognized word based on the word in the original document;

means for applying a word error detection application to the first displayable electronic document to determine whether the recognized word is correct;

means for providing, if the recognized word is incorrect, at least one reference word, each reference word comprising a different set of predetermined characters;

second determining means for determining, if the recognized word is incorrect, for each reference word a corresponding replacement word value; and means for providing, if the recognized word is incorrect, a second displayable electronic document in which the incorrect recognized word is replaced with the reference word most likely matching the at least one word in the original document based on the corresponding replacement word value.

33. An apparatus for recognizing at least one word in an original document, the word including at least one predetermined character, the apparatus comprising:

a scanning device for producing at least a first displayable electronic document including at least a recognized word based on the word in the original document; and a processing device in communication with the scanning device, wherein the processing device comprises:

a central processing unit, an optical character recognition module in communication with the control processing unit, a confusion matrix memory in communication with the central processing unit, a word checking module in communication with the central processing unit, and a word correction module in communication with the central processing unit, wherein, if the central processing unit operating in accordance with the word checking module determines that the recognized word in the first displayable electronic document is incorrect, the central processing unit, operating in accordance with the word correction module and a content of the confusion matrix memory, causes the scanning device to produce a second displayable electronic document in which the incorrect recognized word is replaced with a reference word generated in accordance with the content of the confusion matrix memory.

* * * * *

UNITED STATES PATENT AND TRADEMARK OFFICE
CERTIFICATE OF CORRECTION

PATENT NO.    : 6,154,579
DATED         : November 28, 2000
INVENTOR(S)   : Goldberg It is certified that error appears in the above-identified patent and that said Letters Patent is hereby corrected as shown below:

Column 13,
Line 52, change "values" to -- values, --.

Column 14,
Line 50, change "generating" to -- generating, --.

Column 16,
Line 38, change "character" to -- character, --.

Signed and Sealed this

Eleventh Day of September, 2001

*Attest:*

*Attesting Officer*

NICHOLAS P. GODICI
*Acting Director of the United States Patent and Trademark Office*